2,760,990
VINYL TRANSETHERIFICATION

Warren H. Watanabe, Philadelphia, Pa., and Lawrence E. Conlon, Moorestown, N. J., assignors to Rohm & Haas Company, Philadelphia, Pa., a corporation of Delaware No Drawing. Application August 15, 1952,
Serial No. 304,648

9 Claims. (Cl. 260—614)

This invention concerns a process for preparing vinyl ethers by transetherifying other vinyl ethers with alcohols in the presenec of soluble mercury salts of weak acids. It also deals with novel vinyl ethers.

It has been proposed that volatile vinyl alkyl ethers in which the alkyl group is primary be reacted with primary or secondary monohydric alcohols consisting of carbon, hydrogen, and oxygen in the presence of a basic acetal-splitting catalyst, such as alkaline-reacting diatomaceous earth. This process is confined to relatively few vinyl ethers and alcohols and gives mixtures of ethers. It requires temperatures of 250° to 450° C. It cannot be applied to materials which are sensitive to basic conditions.

Acidic conditions promote the addition of alcohols to the double bond of vinyl ethers. Thus mercury salts of strong acids, such as mercuric sulfate, mercury phosphate, or mercury oxide-boron trifluoride complexes, cause the formation of acetals. Recently it has been shown that if the temperature of a mixture of a vinyl ether, an alcohol which is insensitive to acid, and a mercury salt of a strong acid often with excess strong acid is kept low, below −10° C., some transetherification results along with considerable acetal formation. This method, aside from the inconvenience of working at very low temperatures, is not a rapid or efficient one for yielding ethers. It cannot be applied to substances which are sensitive to strong acids.

It has now been found that vinyl ethers can be transetherified between 0° and about 150° C. in the presence of mercury salts of carboxylic acids, which salts are soluble in the reaction mixture and are formed with acids having a $pK_a$ value in water in the range of 4 to 7. The most important of these catalysts is mercuric acetate, but since acetic acid can be removed therefrom as the temperature of the reaction mixture is raised, it is often desirable to utilize mercury salts of such acids as benzoic methoxyacetic, 2-ethylbutyric, and like acids which react with mercury only to form salts.

Transetherification should best be carried out with mercuric acetate or equivalent catalyst present in a proportion of about 5 grams for 0.25 to 2.5 gram moles of the alcohol to be reacted with a vinyl ether. Mercury acetate is a particularly convenient and available catalyst, but it has the limitation that above about 100° C. acetic acid tends to be removed from the reaction mixture and appears in distillates. This can be compensated for by adding to the reaction mixture along with mercury acetate a higher boiling carboxylic acid than acetic which yields mercury compounds soluble in the reaction mixture. For example, 0.5 to 2.0 moles of benzoic acid per mole of mercuric acetate maintains catalytic activity well above 100° C., apparently through formation of a compound or complex containing mercury.

This method of forming various mercury compounds with the aid of weak acids in situ is a most effective one and is desirable because mercury acetate is ordinarily the most readily commercially available salt of a weak acid. If an acid group other than acetate is desired, mercury acetate and higher boiling carboxylic acid may be intimately mixed together and the mixture is taken up with the starting vinyl ether. At this point the mixture may be heated with stripping off of acetic acid. The reacting alcohol is then added and the mixture heated. Alternatively mercury acetate, carboxylic acid, vinyl ether, and alcohol are mixed and heated. Acetic acid may now be distilled off. The preparation of catalyst in these ways gives a highly active material, effective even at elevated temperatures.

Another method of forming transetherifying catalysts is to mix together a common mercury salt of a strong acid, such as mercuric sulfate, and an alkali metal salt of a desired carboxylic acid. Thus mercuric sulfate may be mixed with sodium oleate, or sodium benzoate, or sodium ethylbutyrate. Such mixtures simulate the mercury salts of weak acids, although they still give considerable acetal formation.

When alcohols are used which are acid sensitive, or which are unstable to acid, or which decompose to give acidic substances, it has been found expedient to control acidity in the reaction mixture by adding a sodium or potassium salt of a weak carboxylic acid. This may be an alkali metal salt of the carboxylic acid which forms the mercury salt. For example, sodium acetate may be used with mercury acetate or sodium benzoate with mercury benzoate, and so on.

There are mercury salts which are effective for some combinations of vinyl ethers and alcohols and are at best poorly effective in other combinations. Such a specific catalyst is mercury oxalate. It has sufficient solubility in some combinations to promote the desired reaction, but is not soluble in other combinations and then has little or no catalytic action therein. It is thus clear that solubility of catalyst in the reaction mixture is an essential property of a mercury salt if it is to be a catalyst.

There are two general procedures for effecting the transetherification reaction. The first of these depends upon the fact that usually vinyl ethers distill 10° to 20° C. below their parent alcohols. Thus, when a high boiling vinyl ether and an alcohol are reacted together, the product vinyl ether may be continuously removed by distillation. This procedure is advantageous in that the equilibrium reaction of vinyl ether and alcohol is continuously shifted toward the reaction products and since the product vinyl ether remains in contact with the reaction mixture only a short time, side reactions are avoided and high yields are obtained.

Best yields have been obtained when the vinylating agent is in excess of the alcohol being vinylated. Mole ratios of vinyl ether to alcohol from 1:1 to about 3:1 have proven satisfactory. Excellent results have been obtained by working between 35° and 150° C. and although higher temperatures may be used, it has been found advisable to work at reduced pressures to handle vinyl ethers which would boil above 150° C. under normal pressures.

A satisfactory procedure for the above method of operating is to mix the vinyl ether to serve as vinylating agent with catalyst and an alcohol different from that supplying an O-radical for the original vinyl ether and heat the mixture under reflux until an equilibrium is reached and then with the reflux ratio adjusted to keep the distillation temperature within the boiling range of the product vinyl ether, this ether is taken off in the distillate.

Inert solvents, such as naphtha, benzene, toluene, xylene, and saturated ethers, may be used. They often facilitate removal of the product. Solvents may also be of interest in dealing with the azeotropic mixtures frequently encountered with mixtures of vinyl ethers and alcohols.

An alternative procedure is to mix initial vinyl ether, the alcohol to be vinylated, and catalyst, with or without inert solvent, and to heat this mixture or to let it stand until equilibrium is at least approached. Since equilibrium can be shifted by having present an excess of one of the reactants, it is generally desirable to have an excess of either the starting alcohol or the initial ether, although excess of ether has proved the more desirable in many cases. Mole ratios of initial reactants may desirably be varied between 1:1 and 4:1. Higher excesses have not given noticeably better results.

When equilibrium has been approached or reached, the equilibrium may be "frozen." A variety of steps are available to accomplish this end. For example, an alkaline reagent, such as anhydrous potassium carbonate, may be added to inactivate the catalyst. The reaction mixture can then be separated by fractional distillation. Again, where a water-soluble alcohol is formed as one of the products, it may be washed out with water or a basic aqueous solution. As yet another step the equilibrium system may be flash-distilled at reduced pressure and the distillate thus obtained fractionally redistilled.

An advantage of the alternative method is that it may be effected at temperatures as low as about 0° C. Thus thermally sensitive or labile compounds may be reacted. Another advantage is that the vinylating agent may be any one of a number of readily available vinyl ethers, including low boiling vinyl ethers, and no restriction need be made on the basis of boiling point. It is particularly convenient to take a low boiling vinyl ether as the initial ether or vinylating agent and to heat the reaction mixture under reflux conditions. Higher temperatures can be used by heating a reaction mixture in a closed system and under pressure, if desired. Solvents may be selected to give higher refluxing and reaction temperatures. Yet a range of 30° to 100° C. is usually satisfactory and is preferred in many cases.

In the separation of vinyl ethers and their corresponding alcohols there are frequently encountered azeotropes. These are composed of a vinyl ether and the corresponding alcohol, the ether being 75% to 95% of the mixture. The azeotropes usually have boiling points at or near those of the pure vinyl ethers.

There are available a number of methods for resolving these azeotropes. Water-soluble alcohols may, for example, be washed out of the mixtures. Alkali-sensitive acohols may often be extracted with a basic aqueous solution. Some alcohols are best disposed of through reaction with an alkali metal. Again, extractive distillation provides a feasible method for resolving azeotropes. Separation of an azeotropic mixture and resolution of this mixture yields the transetherified vinyl ether in good purity.

As vinyl ether to be transetherified there may be used almost any vinyl ether which is free of a substituent which reacts with and destroys the catalyst. The more useful vinyl ethers may be represented by the formula ROCH=CH₂, where R is alkyl, alkenyl, aralkyl, cycloalkyl, alkoxyalkyl, alkenyloxyalkyl, phenoxyalkyl, alkoxyalkoxyalkyl, hydraxyalkyl, and the like. Useful vinyl ethers include polyethers of polyhydric alcohols. Typical ethers which serve as starting materials include methyl vinyl ether, ethyl vinyl ether, butyl vinyl ether, isobutyl vinyl ether, sec.-butyl vinyl ether, tert.-butyl vinyl ether, hexyl vinyl ether, 2-ethyl-hexyl vinyl ether, octyl vinyl ether, nonyl vinyl ether, dodecyl vinyl ether, divinyl ether, allyl vinyl ether, methallyl vinyl ether, undecenyl vinyl ether, cyclohexyl vinyl ether, tetrahydrofurfuryl vinyl ether, benzyl vinyl ether, methoxyethyl vinyl ether, ethoxyethyl vinyl ether, ethoxyethoxyethyl vinyl ether, butoxyethyl vinyl ether, propoxypropyl vinyl ether, octyloxyethyl vinyl ether, cyclohexoxyethyl vinyl ether, phenoxyethyl vinyl ether, butylphenoxyethyl vinyl ether, benzyloxyethyl vinyl ether, methallyloxyethyl vinyl ether, hydroxyethyl vinyl ether, hydroxypropyl vinyl ether, the divinyl ether of ethylene glycol, propylene glycol, diethylene glycol, etc. Ethers with R groups having not over 16 carbon atoms are preferred as starting materials, although larger R groups can be used.

Often it is advantageous to use vinyl ethers with molecular weights not over about 220. The greatest economy is usually had when molecular size of the vinyl ether is relatively small, as from 58 to about 150, although in some situations but slightly volatile vinyl ethers are desirable as starting materials. In such case an ether of large molecular weight will be the ether of choice and there can be used an ether such as butoxyethyl vinyl ether, octoxyethyl vinyl ether, dodecyl vinyl ether, cetyl vinyl ether, or octadecyl vinyl ether.

Alcohols in great variety may be used. The only essential limitation as to the alcohol appears to be that it must be free of substituents which are distinctly acidic or react with and destroy the catalyst. The alcohol residue may be a saturated or olefinically unsaturated hydrocarbon group, cyclic or acyclic. This residue may contain functional groups, such as ether, ester, cyano, keto, hydroxy, nitro, tert.-amino, and the like. It may contain a halogen atom. The alcohol may contain a heterocycle. The alcohol has preferably one to three alcoholic hydroxyl groups.

When an ether linkage is present in the alcohol residue, it can be regarded, for example, as obtained by etherification of one of the hydroxyl groups of a glycol with a monohydric alcohol supplying an alkyl, alkenyl, aralkyl, cyclolakyl, or alkoxyalkyl group, or similar oxyalkyl group or with a phenol which supplies a phenyl group. The substituent containing this ether linkage should usually contain not over 18 carbon atoms, as in the stearyl group, oleyl group, nonylbenzoxyethyl group, the cetyloxyethyl group, or the nonylphenoxypropyl group.

The ether alcohols used for transetherifying vinyl ethers may be represented by a formula such as R'OR"OH, where R" is an alkylene group and R' is alkyl, alkenyl, benzyl, cycloalkyl, phenyl, or alkoxyalkyl, or similar group.

With respect to alcohol residues containing an ester linkage, it should be pointed out that attachment to the oxygen forming the vinyl ether may be in the part of the molecule derived from an alcohol or in that part derived from a carboxylic acid. The hydroxyl-bearing carboxylic ester is usually obtained from a saturated monocarboxylic acid with not over 18 carbon atoms and from an alcohol having a saturated or olefinically unsaturated hydrocarbon non-hydroxyl residue of not over twelve carbon atoms, there being preferably a total of not over 20 carbon atoms in the ester-bearing group.

The hydroxy-esters used for transetherifying may be of the formula HORºCOORˣ or RˣCOORºOH, particularly where Rº is an alkylene group and Rˣ is an alkyl group.

The alcohol residues having tertiary amino groups are usually of the general structure

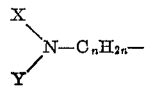

where $n$ is an integer of at least two, usual values for $n$ being from two to six, and X and Y are alkyl, cycloalkyl, or aralkyl. Useful groups for X and Y are derived from secondary amines, such as dimethylamine, diethylamine, dibutylamine, diamylamine, dibenzylamine, dicyclohexylamine, benzylmethylamine, cyclohexylmethylamine, butylmethylamine, octylmethylamine, dodecylmethylamine, and the like, particularly those in which the sum of the carbon atoms in X and Y is not over 14 carbon atoms. The N-substituents, X and Y, may also be part of a heterocyclic group, as in the morpholino, thiamorpholino, pyrrolidino, or piperidino analogues. Typical examples of these are N-hydroxyethylmorpholine, N-hydroxypropylmorpholine, N - hydroxyethylpiperidine, and N - hydroxyethylpyrrolidine.

Examples of alcohols which may be reacted with a vinyl ether to form a different vinyl ether include alkanols such as methyl, ethyl, propyl, isopropyl, butyl, isobutyl, sec.-butyl, tert.-butyl, amyl, hexyl, heptyl, octyl, nonyl, decyl, dodecyl, tetradecyl, hexadecyl, octadecyl, and other alkyl-containing alcohols in their various isomeric forms whether primary, secondary, or tertiary; alkenols, such as allyl, methallyl, crotyl, undecenyl, oleyl, and other olefinically unsaturated alcohols; alicyclic alcohols, including cyclopentanol, cyclohexanol, methylcyclohexanol, hydroabietyl alcohol, dicyclopentenol, hexahydrofluorenyl alcohol, dicyclopentanol, terpineols, hexahydrobenzyl alcohol, tetrahydrobenzyl alcohol, and the like; aralkyl alcohols such as benzyl, methylbenzyl, butylbenzyl, chlorobenzyl, methoxybenzyl, phenylethyl, phenylpropyl, etc.; ether alcohols such as methoxyethyl, ethoxyethyl, ethoxypropyl, ethoxybutyl, butoxyethyl, octoxyethyl, dodecyloxyethyl, phenoxyethyl, octylphenoxyethyl, benzoxyethyl, cyclohexoxyethyl, alloxyethyl, ethoxyethoxyethyl, butoxyethoxyethyl, octoxypolyethoxyethyl, etc.; heterocyclic alcohols such as furfuryl, tetrahydrofurfuryl, or β-2-pyridylethyl alcohols, 2,5-dimethyl-2-hydroxymethyl-2,3-dihydropyran, etc.; substituted alcohols such as 2-nitropropanol, 2 - nitrobutanol, 2-methyl-2-nitropropanol, 2-nitro - 2 - methyl-1,3-propanediol, 2-nitro-2-ethyl-1,3-propanediol, 2-nitro-2-methyl-3-butanol, 3-nitro-2-pentanol, ethylene chlorohydrin or bromohydrin, 2- or 3-chloropropanol, 4-chlorobutanol, 2-chloro-2-nitrobutanol, hydroxyacetonitrile, ethylene cyanohydrin, propylene cyanohydrin, pentamethylene cyanohydrin, dimethylaminoethanol, dibutylaminoethanol, diethylaminopropanol, dimethylaminobutanol, hydroxyethyl acetate, hydroxypropyl acetate, hydroxybutyl acetate, methyl glycolate, ethyl hydracrylate, butyl hydracrylate, octyl hydracrylate, hydroxyethyl butyrate, hydroxyethyl-2-ethylhexoate, methyl lactate, butyl lactate, ethyl-γ-hydroxybutyrate, and other hydroxy esters; 4-hydroxypentanone, 4-hydroxybutanone, and so on.

Polyhydric alcohols are of interest, particularly since they can undergo stepwise vinylation. Typical alcohols of this type which may be used are ethylene glycol, propylene glycol, butylene glycol, and larger alkylene glycols, diethylene glycol, dipropylene glycol, mixed polyglycols having both propylene and ethylene groups, glycerin, glycerin chlorohydrins, mono alkyl ethers of glycerin, pentaglycerol, etc.

Typical transetherifications are described in the following illustrative examples, in which parts are by weight.

Example 1

(a) There were mixed 10 parts of cyclohexanol and 31 parts of 2-ethylhexyl vinyl ether. Thereto were added one part of mercuric acetate and 0.42 part of benzoic acid. The resulting mixture was heated in a reaction vessel equipped with a distilling column. At 71°–80° C./45 mm. a fraction of ten parts was taken off. This was found to be an azeotropic mixture, of which 79% was cyclohexyl vinyl ether.

It was noted that toward the end of the above distillation some mercury appeared in the distillate.

(b) There were mixed 31 parts of 2-ethylhexyl vinyl ether, one part of mercuric acetate, and 0.73 part of benzoic acid. This mixture was heated under reduced pressure and at 90.5° C./50 mm. a small fraction was taken off. The thus treated mixture was mixed with 10 parts of cyclohexanol and the combined materials were heated in the reaction vessel. At 73°–80° C./50 mm. a fraction of 10.2 parts was taken off. This fraction was found by analysis to contain 78.3% of cyclohexyl vinyl ether, corresponding to a 62% conversion.

Repetition of the above procedure with substitution of oleic acid for the above benzoic acid gave a conversion of 41%. With an equal weight of 2-ethylbutyric acid the conversion was 48%.

Example 2

(a) The procedure of Example 1 (a) was repeated with substitution of methoxyacetic acid for the above benzoic acid. Here there was obtained at 71°–80° C./45 mm. five parts of distillate of which 81% was cyclohexyl vinyl ether. The distillate was treated with sodium and redistilled to give pure cyclohexyl vinyl ether.

(b) A mixture of ethyl alcohol, n-butyl vinyl ether, and mercuric oxalate was heated as above. A fraction was taken off at 36° C. which was chiefly ethyl vinyl ether.

On the other hand when a mixture of mercuric oxalate, cyclohexanol, and 2-ethylhexyl vinyl ether was heated, there was no evidence of appreciable transetherification. It was noted that the mercuric oxalate did not dissolve in the reaction mixture and was ineffective therein as a catalyst. Replacement of the oxalate with a mercury salt soluble in these reactants readily gives transetherification.

Example 3

There were mixed 100 parts of n-butyl vinyl ether, 5 parts of mercuric acetate, and 50 parts of ethyl alcohol. The mixture was heated under reflux. A fraction of 71 parts was taken off at 35°–37° C. It was chiefly ethyl vinyl ether. Water was added to the residue and there was then distilled at 93° C. the azeotrope of n-butyl alcohol and water. This was separated to give 71.2 parts of n-butyl alcohol. There was thus obtained a yield of 98% of ethyl vinyl ether while 97% of the butyl alcohol was recovered.

Example 4

There were mixed 5 parts of mercuric acetate and 602 parts of the azeotrope of n-butyl vinyl ether and n-butyl alcohol containing 90% of the ether. Allyl alcohol was added thereto in an amount of 231 parts. This reaction mixture was heated under reflux and then with control of the reflux ratio to hold the head temperature at the desired level, distillate was taken off at 66°–68° C. At six hours additional mercuric acetate was added in an amount of five parts and distillation was continued. Distillation was completed at the end of 20 hours. The distillate amounted to 283 parts. It was an azeotrope consisting of 90% of allyl vinyl ether and 10% of allyl alcohol.

The azeotrope was washed with water to remove the alcohol and the organic layer was distilled at 67.5° C. to give pure allyl vinyl ether, having a refractive index, $n_D^{20}$, of 1.4109. The yield was 87%, based on the allyl alcohol consumed.

The material remaining in the reaction vessel after the above fraction had been taken off was distilled to recover the excess butyl vinyl ether and the n-butyl alcohol which had been formed, amounting to 196 parts.

The above preparation was repeated with some slight modifications. First, the butyl vinyl ether was treated with aqueous ferrous sulfate solution to remove any peroxide present in the ether. Next, the catalyst was added to the butyl vinyl ether along with 5 parts of benzoic acid. This mixture was heated under reflux for two hours. The allyl alcohol was then added and the ether was transetherified. No mercury formed and the reaction proceeded in a clean-cut manner with an excellent yield of allyl vinyl ether.

Example 5

There were mixed 29.2 parts of tert.-butyl alcohol, 86 parts of β-butoxyethyl vinyl ether, and three parts of mercuric acetate. The mixture was heated under reflux and distillate was then taken off at 75°–81° C. Since there was a relatively rapid reduction of catalyst to metallic mercury, the distillation was interrupted and addition was made of three parts of mercuric acetate.

Distillate was obtained in a total of 29.4 parts. It was mixed with 51 parts of β-butoxyethyl vinyl ether and five parts of mercuric acetate. This mixture was heated and distillate taken at 70°–76° C. It was found by analysis to contain 63.5% of tert.-butyl vinyl ether. A portion of 23.3 parts was distilled with toluene. The toluene solution was treated with potassium metal and heated under reflux. There was taken off at 77°–79° C. a fraction of 14.5 parts of tert.-butyl vinyl ether having a refractive index of 1.398.

*Example 6*

There were mixed 20 parts of mercuric acetate, 1000 parts of the azeotrope of 90% n-butyl vinyl ether and 10% butyl alcohol, and 672 parts of isopropyl alcohol. The mixture was heated under reflux with distillate being taken off at 55°–56° C. In 22 hours there had been taken off 757 parts of the azeotrope of isopropyl vinyl ether and isopropanol, containing 83.5% of the ether. Distillation was continued with evolution of 19 parts of of liquid between 60° and 80° C. followed by 80 parts of isopropyl alcohol distilling at 80°–85° C. and then 550 parts of butyl alcohol distilling at 110°–118° C.

At this point the pot residue was filtered to give 47 parts of solids. The filtrate was fractionally distilled at reduced pressures. Small fractions, sufficient for purposes of identification, were obtained of isopropyl n-butyl acetal, distilling at 94°–95° C./100 mm., and of dibutyl acetal, distilling at 90°–97° C./40 mm.

Yields of the desired isopropyl vinyl ether are improved by taking a smaller amount of catalyst or by adding catalyst in increments, by refluxing catalyst in the starting vinyl ether before the alcohol is added, and/or by using an excess of the initial vinyl ether. Such excess constitutes a preferred condition in transetherification according to this procedure.

*Example 7*

There were mixed 3 parts of mercuric acetate, 65 parts of n-octyl alcohol, and 216 parts of ethyl vinyl ether. This mixture was heated under reflux for six hours. During this time the temperature of the refluxing mixture rose from 39.5° to 42° C. The mixture was cooled and treated with two parts of anhydrous potassium carbonate. The mixture was then heated under reduced pressure while excess ethyl vinyl ether and the ethyl alcohol formed were stripped off. There was then taken at 64°–65° C./5 mm. a fraction of 28 parts of azeotrope containing octyl vinyl ether. At 75°–77° C./5 mm. there was recovered n-octyl alcohol in an amount of 30 parts.

The azeotrope was found by analysis to contain 83% of n-octyl vinyl ether. It was treated with sodium and n-octyl vinyl ether was distilled at about 64° C./5 mm. The refractive index, $n_D^{20}$, was 1.4268. The yield was 64%.

In place of n-octyl alcohol used above there may be reacted in the same way other octyl alcohols. Likewise, still longer chained alcohols can be used in the reaction and the corresponding alkyl vinyl ethers obtained in favorable yield in good purity.

*Example 8*

There were mixed 3 parts of mercuric acetate, 54 parts of benzyl alcohol, and 167 parts of the azeotrope of n-butyl vinyl ether and n-butanol, the azeotrope supplying 150 parts of the ether. The mixture was heated to dissolve the catalyst and heated under reflux for 80 minutes. The temperature of the refluxing solution rose from 99° to 103.5° C. The mixture was cooled and low-boiling material stripped off at reduced pressure. From this low-boiling fraction there was obtained on distillation 130 parts of n-butyl vinyl ether and 32 parts of a residue.

The above stripped material was fractionally distilled to give two parts of butyl alcohol, then 23.2 parts of a fraction at 87.5° C./25 mm. to 90° C./10 mm., and 13.2 parts of benzyl alcohol. The above fraction was combined with residue from distillation of the stripped-off material and this mixture was fractionally distilled to give 12.4 parts of butyl alcohol and 25.2 parts of an azeotrope distilling at 76°–76.5° C./15 mm. This azeotrope was treated with sodium metal and then distilled to give 22 parts of benzyl vinyl ether, distilling at 103°–104° C./25 mm.

*Example 9*

There were mixed 59.6 parts of commercial 2-methyl-2-nitro-1-propanol, 146.2 parts of vinyl ethyl ether, 5 parts of mercuric acetate, and 5 parts of sodium acetate. The mixture was heated under reflux for six hours. During this time the pot temperature rose from 39° to 41° C. The reaction mixture was cooled and washed five time with 100 part portions of water. The organic layer was dried over calcium sulfate and flash-distilled into a receiver cooled with solid carbon dioxide until the distillate began to crystallize on the sides of the distilling vessel. The distillate thus obtained was fractionated. Unreacted ethyl vinyl ether was taken off. A fraction was then taken at 43°–70° C./15 mm. There were then collected between 71° C./10 mm. and 80° C./10 mm. 25 parts of azeotrope containing 91.4% of 2-nitro-2-methylpropyl vinyl ether.

This crude product was treated with solid sodium hydroxide and then with aqueous 50% sodium hydroxide solution. On redistillation there was obtained 2-nitro-2-methylpropyl vinyl ether, distilling at 77°–78° C./10 mm. and having a refractive index, $n_D^{20}$ of 1.4400. By vinyl analysis this product was 99.7% pure. It gave the following analyses: carbon, 49.85%; hydrogen, 7.55%; and nitrogen (Dumas), 9.52%. Corresponding theoretical values are 49.64%, 7.64%, and 9.65%, respectively.

There were reacted 49 parts of 2-nitro-1-butanol, 144 parts of ethyl vinyl ether, and five parts of mercuric acetate, with five parts of sodium acetate, as above. The product obtained was 2-nitrobutyl vinyl ether.

The nitroalkyl vinyl ethers are compounds which have not heretofore been available from previously known methods of synthesis. They are of interest as chemical intermediates and as materials for preparing nitro-containing polymers and copolymers, of interest as combustible plastics. Nitroalkyl vinyl ethers having alkyl groups from two to five carbon atoms are of particular interest.

*Example 10*

Solution was made of 5 parts of mercuric acetate in 61.5 parts of 2-(β-hydroxyethyl)pyridine which had been freshly distilled at 72° C./0.35 mm. and 288 parts of ethyl vinyl ether. This mixture was heated for seven hours under reflux, the average pot temperature being 39° C. The reaction mixture was then flash-distilled up to a temperature of 27° C./1 mm. The distillate was collected in a receiver cooled with Dry Ice. The residue from the flash-distillation was fractionated to give 29.5 parts of vinyl-containing material distilling at 98°–110° C./22 mm. By analysis this contained 80% of 2-(2-vinyloxyethyl)pyridine. It was dissolved in about 40 parts of ether. The ether solution was repeatedly washed with small portions of water, dried, and distilled. The desired pure vinyl ether

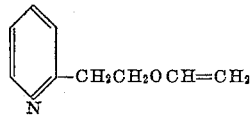

distilled at 87°–89.5° C./10 mm. It had a refractive index, $n_D^{20}$, of 1.5118, a density at 26° C. of 1.0035, and a molecular refraction of 45.3 (theory 44.6). By vinyl analysis it was 98.4% pure. It contained by analysis 72.84% of carbon, 7.44% of hydrogen, and 9.25% of nitrogen (Dumas). Theoretical values are 72.45%, 7.43%, and 9.39%, respectively.

This is a novel compound which is not obtained by vinylation of the pyridylethanol with acetylene.

In the same way other pyridyl ethyl vinyl ethers can be prepared. The starting alcohol may be one such as 4-(β-hydroxyethyl)pyridine, 2-(2-pyridyl)-1,3-propanediol, 2-(β-hydroxyethyl)-5-ethylpyridine, 2-(β-hydroxyethyl)-4-methylpyridine, 2-methyl-6-(β-hydroxyethyl)-pyridine, 2-methyl-3-(β-hydroxyethyl)pyridine, 3-ethyl-4-(β-hydroxyethyl)pyridine, 2-(β-hydroxypropyl)pyridine, 2-(β-hydroxybutyl)pyridine, β-(2-pyridyl)allyl alcohol, 2-(β-hydroxyethyl)quinoline, 4-(β-hydroxyethyl)quinoline, 9-(β-hydroxyethyl)acridine, 2-(β-hydroxypropyl)-5,6-benzoquinoline, and the like.

The vinyl ethers formed from these alcohols are of a new type. They are of particular value for forming copolymers with acrylonitrile, imparting to the resulting products a basicity which is useful for imparting dyeing properties to fibers formed from these copolymers.

Example 11

There were mixed 100 parts of ethylene chlorohydrin, 288 parts of ethyl vinyl ether, 10 parts of mercuric acetate, and 6 parts of sodium acetate. This mixture was heated under reflux for eight hours and left standing for 16 hours. The reaction mixture was then washed with three 55-part portions of aqueous 10% sodium hydroxide solution followed by three 60-part portions of saturated aqueous sodium chloride solution. The organic layer was dried on sodium sulfate and flash-distilled at reduced pressure into a receiver chilled with Dry Ice. The flash-distillate was fractionally redistilled to give 56 parts of an azeotropic mixture, distilling at 55°–62° C./120 mm. and containing 86% of chloroethyl vinyl ether. This mixture was washed with aqueous 10% sodium hydroxide solution and redistilled at 58°–59° C./120 mm. to give pure 2-chloroethyl vinyl ether. The product had a refractive index, $n_D^{20}$, of 1.4378.

Example 12

There were charged to a reaction vessel 161 parts of ethylene chlorohydrin, 292.2 parts of 2-ethylhexyl vinyl ether, 5 parts of mercuric acetate, 3.81 parts of benzoic acid, and 10 parts of sodium benzoate. The mixture was heated to cause distillation through a packed column at an initial pressure of 120 mm. A fraction of 131.2 parts was taken at 55°–70° C./120 mm. and a fraction of 27 parts at 70°–73° C./90 mm. The first fraction contained 85% of 2-chloroethyl vinyl ether. It was washed several times with aqueous 10% sodium hydroxide solution and redistilled at 59° C./120 mm. to give pure 2-chloroethyl vinyl ether in a yield of 73%. The second fraction was recovered ethylene chlorohydrin.

There was mixed one gram mole of ethylene chlorohydrin and 3.5 gram moles of ethyl vinyl ether and thereto was added 10 grams of mercuric acetate and 5 grams of sodium acetate. The mixture was stirred for two hours with the temperature at 25°–30° C. The reaction mixture was worked up and chloroethyl vinyl ether was separated in a conversion of 6%. Another mixture of the above materials in the same proportions was left 15 days at 25°–30° C. and worked up with a conversion of 30% of chloroethyl vinyl ether.

Another mixture of the above materials in the same proportions was heated at 38°–44° C. for eight hours and worked up. There was obtained a conversion of 37%. Another mixture like the above was heated at 70° C. in a bomb under pressure at 70° C. The conversion was 38%.

A mixture of one gram mole of ethylene chlorohydrin and 3.5 grams of isopropyl vinyl ether with mercuric acetate and sodium acetate was heated for nine hours under reflux at above 63° C. The conversion was 37%.

A mixture of three gram moles of ethyl vinyl ether and one gram mole of ethylene chlorohydrin with five grams of mercuric acetate was heated at 40° C. for eight hours. The conversion to chlorethyl vinyl ether was 37%.

There were mixed 312 parts of 2-ethylhexyl vinyl ether, 5 parts of mercuric acetate, 3.8 parts of benzoic acid, 10 parts of sodium benzoate, and 160 parts of ethylene chlorohydrin. The mixture was heated under reflux and chloroethyl vinyl ether was then taken off in a distillate which, when worked up, gave a yield of 73% of 2-chloroethyl vinyl ether.

Reaction of butoxyethyl vinyl ether and ethylene chlorohydrin in the presence of mercuric acetate and sodium acetate with comparable conditions of distillation and purification gave a 55% yield of pure chloroethyl vinyl ether.

Example 13

A mixture of 3 parts of mercuric acetate, 3 parts of sodium acetate, 50 parts of ethylene cyanohydrin, and 172 parts of isopropyl vinyl ether was heated under reflux for nine hours. During this time the pot temperature rose from 58.5° to 62° C. The reaction mixture was cooled and washed twice with 45 parts of aqueous 10% sodium hydroxide solution and three times with 50-part portions of a saturated salt solution. The washed liquid was dried over anhydrous potassium carbonate and flash-distilled under reduced pressure into a receiver cooled with Dry Ice. The flash-distillate was fractionated to give recovered isopropyl vinyl ether, isopropyl alcohol, and 17.5 parts of a product, distilling at 75°–86° C./18 mm., which by analysis contained 96% of 2-cyanoethyl vinyl ether. Pure cyanoethyl vinyl ether was obtained on redistillation. This substance distilled at 79°–80– C./20 mm. It had a refractive index, $n_D^{20}$, of 1.4335, a density of 0.9540, and a molecular refraction of 26.28 (theory 26.21). By analysis it contained 61.75% of carbon, 7.23% of hydrogen, and 14.37% of nitrogen (Kjeldahl). Corresponding theoretical values are 61.83%, 7.27%, and 14.44%, respectively.

Vinyl analysis was made by hydrolyzing this ether to acetaldehyde, reacting the acetaldehyde with hydroxylamine, and estimating the acetaldehyde oxime. The value obtained was 100.2%, providing positive evidence for the presence of one vinyl group in the product. The vinyl ether was hydrogenated at 1500 p. s. i. at 100°–105° C. on Raney nickel. Three moles of hydrogen were absorbed per mole of ether. The hydrogenation product was distilled at 79° C./120 mm. It corresponded in composition to 3-ethoxypropylamine, had a refractive index, $n_D^{20}$, of 1.4190 and a density of 0.844, and a neutralization equivalent of 103.4 (theory 103.2).

Repetition of the above procedure with substitution of ethyl vinyl ether gave 2-cyanoethyl vinyl ether in about the same yield. It was found that n-butyl vinyl ether was not satisfactory as a starting material because the products, by-products, and reactants were poorly separable. The divinyl ether of ethylene glycol gave good results.

There were mixed a one half gram mole portion of ethylene cyanohydrin (35.5 grams) and one gram mole of $CH_2=CHOC_2H_4OCH=CH_2$ with two grams of mercuric acetate and five grams of sodium acetate. The mixture was heated to 125° C. over a two hour period and worked up as above. The yield of 2-cyanoethyl vinyl ether was 40%.

Example 14

There were mixed 40.3 parts of 2-methoxyethanol, 144 parts of butoxyethyl vinyl ether, and three parts of mercuric acetate. The reaction mixture was heated at reflux and distilled. The fraction collected at 106°–108° C. was chiefly methoxyethyl vinyl ether, having a refractive index at 20° C. after purification of 1.4105. The conversion was 62%.

Example 15

In the same way there were mixed and reacted 85 parts of dicyclopentenyl alcohol and 150 parts of n-butyl vinyl ether with three parts of mercuric acetate. The mixture was heated at 104° C. for 6.5 hours and then worked up. A fraction of dicyclopentyl vinyl ether was distilled at 91°–93° C./5 mm. in a conversion of 44%. The purified product had a refractive index at 20° C. of 1.5068.

*Example 16*

There were mixed 36 parts of methallyl alcohol, 156 parts of 2-ethylhexyl vinyl ether, five parts of mercuric acetate, and two parts of benzoic acid. The mixture was heated at reflux and then methallyl vinyl ether was distilled off at 87.5°–88.5° C. The refractive index of this compound was 1.4256.

*Example 17*

There were mixed 47 parts of 2-chloroallyl alcohol, 144 parts of ethyl vinyl ether, five parts of mercuric acetate and 10 parts of sodium acetate. The mixture was heated at 41° C. for six hours and then treated with potassium carbonate and worked up to give an azeotrope of chloroallyl vinyl ether and chloroallyl alcohol. Vinyl analysis showed that 90% of this mixture was the desired chloroallyl vinyl ether, a new compound. The mixture was washed with water and redistilled to give the pure chloroallyl vinyl ether.

*Example 18*

A solution of five parts of mercuric acetate and 1.92 parts of benzoic acid in 243 parts of crude cetyl vinyl ether containing approximately 90% by weight of the vinyl ether was heated under reflux and distilled to remove acetic acid. This mixture was cooled, 63 parts of ethylene glycol added, and the mixture, which was two-phase at the start but which became homogeneous after being heated under reflux, was again fractionated. The fraction boiling at 70°–80° C./78 mm. and consisting of 43 parts was collected. This fraction was redistilled, and there were obtained 8.5 parts of 2-methyl-1, 3-dioxolane, 5.5 parts of a mixture of the divinyl and monovinyl ethers of ethylene glycol, distilling at 71° C./100 mm. to 75° C./80 mm., containing 76% by weight of the divinyl ether and 24% by weight of the monovinyl ether, and a final fraction of 24 parts at 74°–76° C./60 mm. consisting of the monovinyl ether of ethylene glycol. The mixture of the divinyl and monovinyl ethers was washed with water and redistilled to give the pure divinyl ether, distilling at 126°–127° C., with a refractive index at 20° C. of 1.4341. The monovinyl ether, which is obtained substantially pure directly from the reaction, has a refractive index at 20° C. of 1.4350.

*Example 19*

There were mixed 51 parts of 2-hydroxy-4-pentanone, 144 parts of ethyl vinyl ether, and five parts of mercuric acetate. This solution was heated under reflux at 47° C. for 5.5 hours. The reaction mixture was cooled and washed with three 50-part portions of water to remove unreacted 2-hydroxy-4-pentanone, dried over anhydrous potassium carbonate, and flash-distilled at reduced pressure into a receiver cooled with Dry Ice. Fractionation of this distillate gave 22.3 parts distilling at 59°–63° C./10 mm. This material was diluted with an equivalent volume of ether and washed with several 10-part portions of 10% sodium hydroxide solution and with water, and was redistilled to give 1-methyl-3-ketobutyl vinyl ether, distilling at 55°–56° C./8 mm., having the structure, $$CH_3COCH_2CH(CH_3)OCH=CH_2$$

and having a refractive index at 20° C. of 1.4316.

*Example 20*

There were mixed 98 parts of furfuryl alcohol, 288 parts of ethyl vinyl ether, and five parts of mercuric acetate. The mixture was heated at 42° C. for 5.5 hours and worked up as Example 7. Furfuryl vinyl ether was obtained, distilling at 70°–71° C./40 mm. It had a refractive index of 1.4740.

*Example 21*

In the same way 89 parts of dimethylaminoethanol, 288 parts of ethyl vinyl ether, and five parts of mercuric acetate were mixed and heated at 42° C. for 4.5 hours. The desired product, dimethylaminoethyl vinyl ether, was obtained as a liquid distilling at 120°–122° C. and having a refractive index of 1.4259 for the purified material.

*Example 22*

In the same way there were mixed and reacted 52 parts of hydroxyethyl acetate, 200 parts of butyl vinyl ether, and five parts of mercuric acetate. The desired product, $CH_3COOC_2H_4OCH=CH_2$, was obtained in a conversion of 30%.

Ethyl lactate was similarly reacted with butyl vinyl ether to yield $C_2H_5OOCCH(CH_3)OCH=CH_2$. Other hydroxy esters can be vinylated in the same way.

*Example 23*

In the same way there were mixed and reacted 110 parts of ethyl vinyl ether, 5 parts of mercuric acetate, and 60 parts of β-phenylethyl alcohol. The desired product, phenylethyl vinyl ether, was obtained as a liquid distilling at 84°–85° C./10 mm.

*Example 24*

There were mixed 100 parts of tetrahydrofurfuryl alcohol, five parts of mercuric acetate, and 285 parts of ethyl vinyl ether. The mixture was heated under reflux and then distilled. The distillate containing tetrahydrofurfuryl vinyl ether was treated with sodium and redistilled. The fraction taken at 64°–60° C./20 mm. was pure tetrahydrofurfuryl vinyl ethyl, having a refractive index at 20° C. of 1.4491.

Vinyl ethers are of value because they form polymers and copolymers which have desirable properties for many types of applications. They are useful also as chemical intermediates.

We claim:

1. A process for transetherifying vinyl ethers which comprises bringing together in the absence of a strong inorganic acid at a reacting temperature between about 0° and about 150° C. in the presence of a catalyst which is a mercury salt of a carboxylic acid which in water gives a pKa value of 4 to 7, said salt being soluble in the reaction mixture, (A) a vinyl ether, $ROCH=CH_2$, R being a member of the class consisting of alkyl, alkenyl, aralkyl, cycloalkyl, alkoxyalkyl, alkenyloxyalkyl, phenoxyalkyl, alkoxyalkoxyalkyl, and hydroxyalkyl groups of not over 16 carbon atoms and (B) an alcohol having 1 to 3 alcoholic hydroxyl groups attached to a radical different from the R group of the vinyl ether, said radical being free of distinctly acidic constituents and constituents which react with and destroy the catalyst and being selected from the class consisting of alkyl, alkylene, propylyne, alkenyl, alicyclic hydrocarbon, aralkyl, nitroalkyl, chloroalkyl, chloroalkenyl, bromoalkyl, cyanoalkyl, tert-aminoalkyl, alkoxyalkyl, alkoxyalkoxyalkyl, phenoxyalkyl, alkoxycarbonylalkyl, alkylcarbonyloxyalkyl, alkylcarbonylalkyl, furfuryl, and tetrahydrofurfural groups with a carbon content of not over about 20 carbon atoms, and separating the transetherified vinyl ether.

2. A process for transetherifying a vinyl ether $ROCH=CH_2$ with an alcohol having 1 to 3 alcoholic hydroxyl groups attached to a radical different from the R group of the starting vinyl ether which comprises heating together in the absence of a strong inorganic acid at a reacting temperature between 30° and 150° C. a said vinyl ether and a said alcohol in the presence of mercuric acetate as a catalyst, whereby the starting vinyl ether is converted into a transetherified vinyl ether with the residue of said alcohol and distilling off the transetherified vinyl ether, the group R being a member of the class consisting of alkyl, alkenyl, aralkyl, cycloalkyl, alkoxyalkyl, alkenyloxyalkyl, phenoxyalkyl, alkoxyalkoxyalkyl, and hydroxyalkyl groups of not over 16 carbon atoms and the radical of said alcohol being free of distinctly acidic constituents and constituents which react with and destroy the catalyst and being selected from the class consisting of alkyl, alkylene, propylyne, alkenyl, alicyclic hydrocarbon, aralkyl, nitroalkyl, chloroalkyl, chloroalkenyl, bromoalkyl, cyanoalkyl, tert-aminoalkyl, alkoxyalkyl, alkoxyalkoxyalkyl, phenoxyalkyl, alkoxycarbonylalkyl, alkylcarbonyloxyalkyl, alkylcarbonylalkyl, furfuryl and tetrahydrofurfural groups with a carbon content of not over about 20 carbon atoms.

3. A process for transetherifying a vinyl ether ROCH=CH$_2$ with an alcohol having 1 to 3 alcoholic hydroxyl groups attached to a radical different from the R group of the starting vinyl ether which comprises bringing together in the absence of a strong inorganic acid at temperatures between 35° and 150° C. a said vinyl ether and a said alcohol in the presence of a catalyst which is a mercury salt of a carboxylic acid which in water gives a pK$_a$ value of 4 to 7, said salt being soluble in the reaction mixture, effecting reaction between said vinyl ether and said alcohol, and separating reaction products and catalyst, the group R being a member of the class consisting of alkyl, alkenyl, aralkyl, cycloalkyl, alkoxyalkyl, alkenyloxyalkyl, phenoxyalkyl, alkoxyalkyl, and hydroxyalkyl groups of not over 16 carbon atoms and the radical of said alcohol being free of distinctly acidic constituents and constituents which react with and destroy the catalyst and being selected from the class consisting of alkyl, alkylene, propylyne, alkenyl, alicyclic hydrocarbon, aralkyl, nitroalkyl, chloroalkyl, chloroalkenyl, bromoalkyl, cyanoalkyl, tertaminoalkyl, alkoxyalkyl, alkoxyalkoxyalkyl, phenoxyalkyl, alkoxycarbonylalkyl, alkylcarbonyloxyalkyl, alkylcarbonylalkyl, furfuryl, and tetrahydrofurfuryl groups with a carbon content of not over about 20 carbon atoms.

4. A process for preparing transetherified vinyl ethers which comprises reacting ethyl vinyl ether and an alcohol having 1 to 3 alcoholic hydroxyl groups attached to a radial other than ethyl by heating together in the absence of a strong inorganic acid said ether and said alcohol under reflux at a temperature between 0° and 150° and at a pressure permitting reflux within this temperature range in the presence of mercuric acetate as a catalyst and separating the transetherified vinyl ether, said alcohol having a radical which is free of distinctly acidic constituents and constituents which react with and destroy the catalyst and which is selected from the class consisting of alkyl, alkylene, propylyne, alkenyl, alicyclic hydrocarbon, aralkyl, nitroalkyl, chloroalkyl, chloroalkenyl, bromoalkyl, cyanoalkyl, tert-aminoalkyl, alkoxyalkyl, alkoxyalkoxyalkyl, phenoxyalkyl, alkoxycarbonylalkyl, alkylcarbonyloxyalkyl, alkylcarbonylalkyl, furfuryl, and tetrahydrofurfuryl groups with a carbon content of not over about 20 carbon atoms.

5. A process for transetherifying vinyl ethers which comprises mixing together a vinyl ether ROCH=CH$_2$, mercuric acetate, and a carboxylic acid giving a pK$_a$ value of 4 to 7 and yielding a reaction product with mercuric acetate which is soluble in said ether, heating the resulting mixture in the absence of a strong inorganic acid with removal of acetic acid, mixing with the resulting composition and reacting therewith at a reacting temperature between 0° and 150° C. an alcohol having 1 to 3 alcoholic hydroxyl groups attached to a radical different from R of the said vinyl ether, the group R being a member of the class consisting of alkyl, alkenyl, aralkyl, cycloalkyl, alkoxyalkyl, alkenyloxyalkyl, phenoxyalkyl, alkoxyalkoxyalkyl, and hydroxyalkyl groups of not over 16 carbon atoms and the radical of said alcohol being free of distinctly acidic constituents nad constituents which react with and destroy the catalyst and being selected from the class consisting of alkyl, alkylene, propylyne, alkenyl, alicyclic hydrocarbon, aralkyl, nitroalkyl, chloroalkyl, chloroalkenyl, bromoalkyl, cyanoalkyl, tert-aminoalkyl, alkoxyalkyl, alkoxyalkoxyalkyl, phenoxyalkyl, alkoxycarbonylalkyl, alkylcarbonyloxyalkyl, alkylcarbonylalkyl, furfuryl, and tetrahydrofurfuryl groups with a carbon content of not over about 20 carbon atoms.

6. The process of claim 5 in which the vinyl ether ROCH=CH$_2$ is used in stoichiometric excess of alcohol to be reacted therewith.

7. A process for forming a nitroalkyl vinyl ether which comprises reacting together a nitroalkanol of two to five carbon atoms and a vinyl ether ROCH=CH$_2$ in the absence of a strong inorganic acid at a reacting temperature between 0° and about 150° C. in the presence of a catalyst which is a mercury salt of a carboxylic acid which in water gives a pK$_a$ value of 4 to 7 said salt being soluble in the reaction mixture, the group R being a member of the class consisting of alkyl, alkenyl, aralkyl, cycloalkyl, alkoxyalkyl, alkenyloxyalkyl, phenoxyalkyl, alkoxyalkoxyalkyl, and hydroxyalkyl groups of not over 16 carbon atoms.

8. A process for preparing 2-nitro-2-methylpropyl vinyl ether which comprises mixing 2-methyl-2-nitro-1-propanol, vinyl ethyl ether, mercuric acetate, and sodium acetate and at a temperature between 0° and about 150° C. and at a pressure permitting reflux within this temperature range heating the resulting mixture under reflux in the absence of a strong inorganic acid.

9. A process for preparing 2-nitrobutyl vinyl ether which comprises mixing 2-nitro-1-butanol, vinyl ethyl ether, mercuric acetate, and sodium acetate, and at a temperature between 0° and about 150° C. and at a pressure permitting reflux within this temperature range heating the resulting mixture under reflux in the absence of a strong inorganic acid.

References Cited in the file of this patent

UNITED STATES PATENTS

| | | |
|---|---|---|
| 2,047,398 | Voss et al. | July 14, 1936 |
| 2,579,411 | Adelman | Dec. 18, 1951 |
| 2,579,412 | Adelman | Dec. 18, 1951 |